(12) United States Patent
Warmerdam

(10) Patent No.: US 10,980,189 B1
(45) Date of Patent: Apr. 20, 2021

(54) SYSTEMS, DEVICES, AND/OR METHODS FOR MANAGING STORM WATER

(71) Applicant: Oscar Warmerdam, Culpeper, VA (US)

(72) Inventor: Oscar Warmerdam, Culpeper, VA (US)

( * ) Notice: Subject to any disclaimer, the term of this patent is extended or adjusted under 35 U.S.C. 154(b) by 504 days.

(21) Appl. No.: 15/491,291

(22) Filed: Apr. 19, 2017

Related U.S. Application Data

(60) Provisional application No. 62/324,391, filed on Apr. 19, 2016.

(51) Int. Cl.
*A01G 9/02* (2018.01)
*A01G 9/029* (2018.01)
*A01G 24/00* (2018.01)
*A01G 24/18* (2018.01)

(52) U.S. Cl.
CPC ........... *A01G 9/0295* (2018.02); *A01G 9/027* (2013.01); *A01G 24/00* (2018.02); *A01G 24/18* (2018.02)

(58) Field of Classification Search
CPC ........ A01G 24/00; A01G 24/18; A01G 9/027; A01G 9/0295
USPC .......................................................... 47/65.9
See application file for complete search history.

(56) References Cited

U.S. PATENT DOCUMENTS

| | | | |
|---|---|---|---|
| 4,776,144 A | 10/1988 | Pardo | |
| 5,311,700 A * | 5/1994 | Thomas | A01G 23/04 47/76 |
| 5,992,093 A * | 11/1999 | De Groot | A01G 24/00 47/64 |
| 6,336,291 B1 * | 1/2002 | Skuba | A01G 20/20 47/58.1 R |
| 6,526,710 B1 * | 3/2003 | Killen | E04F 15/02411 52/105 |
| 6,606,823 B1 * | 8/2003 | McDonough | E04D 11/002 47/65.9 |
| 6,711,851 B2 | 3/2004 | Mischo | |
| 7,726,071 B2 * | 6/2010 | Carpenter | E04D 11/002 47/65.9 |
| 7,805,885 B2 * | 10/2010 | Luckett | A01G 9/033 47/65.9 |
| 8,209,905 B2 * | 7/2012 | Furumura | A01G 27/02 47/65.9 |
| 8,479,443 B2 * | 7/2013 | Buist | A01G 9/033 47/65.9 |
| 8,555,545 B2 | 10/2013 | Fischer | |
| 8,966,817 B2 * | 3/2015 | Cronk | A01G 9/025 47/81 |
| 9,265,200 B2 * | 2/2016 | Buist | A01G 9/033 |
| 10,422,139 B1 * | 9/2019 | Warmerdam | E04D 13/04 |
| 2002/0007593 A1 * | 1/2002 | Mischo | A01G 9/033 47/86 |
| 2009/0188172 A1 | 7/2009 | DuCharme | |
| 2009/0226260 A1 | 9/2009 | Boulton | |
| 2011/0138703 A1 | 6/2011 | Repasky | |
| 2012/0227319 A1 | 9/2012 | Jaslow | |
| 2013/0167440 A1 | 7/2013 | Fischer | |

(Continued)

*Primary Examiner* — Ebony E Evans
(74) *Attorney, Agent, or Firm* — Akerman LLP

(57) ABSTRACT

Certain exemplary embodiments can provide a system comprising a plurality of trays, at least one retention layer configured to absorb at least a portion of water that falls upon the plurality of trays, and/or a drainage layer configured to allow the water to drain out of the at least one retention layer.

20 Claims, 10 Drawing Sheets

(56) References Cited

U.S. PATENT DOCUMENTS

2013/0333285 A1\* 12/2013 Buist ...................... A01G 9/033
 47/65.9
2014/0130410 A1 5/2014 Sumi
2015/0117949 A1 4/2015 Battersby \* cited by examiner

SYSTEMS, DEVICES, AND/OR METHODS FOR MANAGING STORM WATER

CROSS-REFERENCES TO RELATED APPLICATIONS

This application claims priority to, and incorporates by reference herein in its entirety and in its contextually relevant parts, U.S. Provisional Patent Application 62/324,391, filed 19 Apr. 2016.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Figure 1:
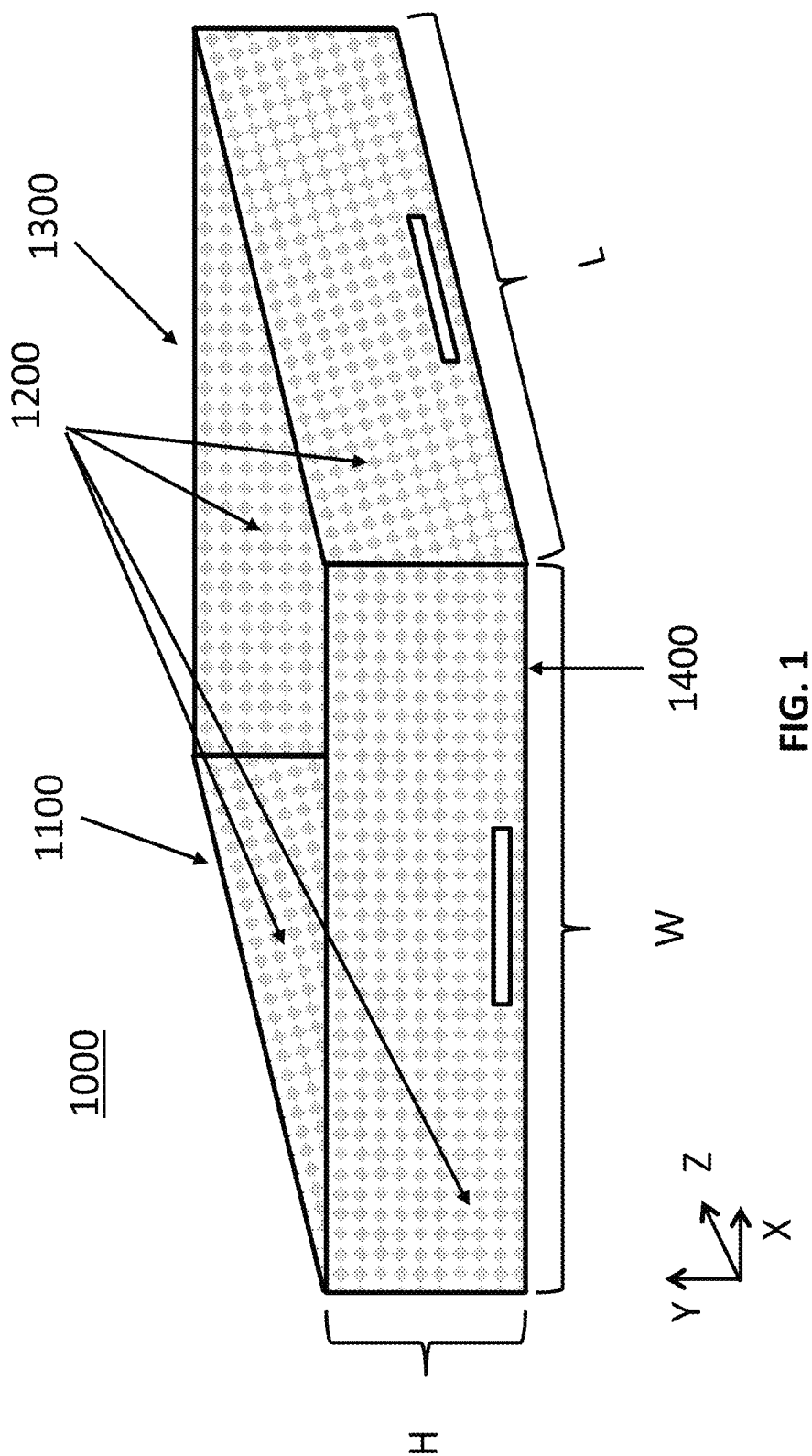
FIG. 1 is a perspective view of an exemplary embodiment of a tray of a water management system.

Storm water can carry a substantial amount of pollutants to certain natural bodies of water. For example, storm water is the biggest source of pollution of the Chesapeake Bay. As federal, state, and local storm water volume and storm water quality regulations become more intentional and more specific, such as in regards to storm water volume and/or storm water performance (delay), city planners, building owners, civil engineers, architects, etc. can look for ways to retain most or all of the storm water that falls on any given property and/or surface. Improved areas such as driveways, walkways, roofs, patios, and/or plaza decks typically are impermeable to water. To meet regulations, this water can be to be intentionally retained and detained (delayed).

For substantially flat roofs, it is sometimes desired to overlay the roof with a paver surface on which to walk. Yet because roof surfaces can be bumpy, sloped at different angles, and/or uneven, pedestals can be used to support, level, and/or stabilize the pavers, and thereby create a substantially flat paver surface.

Pedestals are typically somewhat cylindrical and thereby define a longitudinal axis. At either end, a pedestal might flare to some degree to provide a greater load-bearing and/or attachment area, and thus longitudinal cross-sections of the pedestal might vary in diameter (if a circle) or width (if an oval, ellipse, or other closed polygon) depending where along the longitudinal axis the section is taken. Pedestals typically are adjustable in height and/or have a foot that covers a substantially circular, elliptical, and/or polygonal area. Each pedestal device typically can support 1-4 pavers, and more commonly will support at least two pavers. The pedestals usually are placed on top of a water resistant membrane (with insulation underneath the membrane) or a water proofing membrane (with insulation on top of the membrane). The space underneath these pavers is usually void and might be used to house only conduit, pipes, cabling, etc. The typical paver does not absorb a substantial amount of water, and instead storm water runs to the edge of the paver, and falls through the cracks, and then flows through the void space to the drains. Thus, there is virtually zero storm water retention or detention underneath these raised pedestal paver systems. The void space is almost always sloped to allow the water to rush to the drains during a rain event. Therefore, the regulations typically do not allocate any storm water retention credit and/or value to such paver areas.

Certain exemplary embodiments can utilize the space underneath the raised pavers to place a system comprising a plurality of two-layer panel-like assemblies that can provide:

Storm water retention and/or peak flow delay underneath pavers (currently not utilized by any other solution):
  Layer 1: The water retentive layer can:
    purposefully rapidly absorb a certain amount of storm water; and/or
    purposefully delay the vertical water flow (Saturated Conductivity Flow rate).
  Layer 2: The drainage layer can:
    allow excess water to drain out of the retentive layer and/or cause a purposeful delayed flow to the drains; and/or
    ensure rapid absorption. In order for Layer 1 to more readily accept water into the retention layer, the empty pore air space in the mineral wool, when dry, can be freely replaced with water. Layer 2 can help facilitate this by allowing the water to push out the air in the mineral wool layer (if, Layer 1 is used without Layer 2, the system likely will not absorb water as rapidly.)
Purposeful rapid dehydration of the assembly in order to ready itself for the next storm event: The assembly (and/or system of which it is a component) can be designed to maximize water retention, delay storm water outflow to the drains, and/or dehydrate rapidly through the use of airflow that can take place through the purposeful design of the assembly.
  Layer 1: The storm water retentive layer can release water readily through evaporation.
  Layer 2: The drainage layers under and/or in between the storm water retentive layers can allow and/or encourage airflow under and/or in between the retentive layers. This can have multiple benefits, including:
    The assembly and/or system can be ready sooner, with renewed capacity, for the next storm event.

The assembly and/or system can ensure rapid dehydration. In order for Layer 1 to release water through evaporation from the retention layer, the water filled pore space in the mineral wool, when saturated/wet, can be replaced with air. Layer 2 can facilitate that by allowing the water to pull air freely into the retention layer. Layer 1 used without Layer 2 typically will not dehydrate water as rapidly.

To create conditions that prevent moisture related infestations:
  Layer 2: The drainage layers under and/or in between the storm water retentive layers can allow and/or encourage airflow under and/or in between the retentive layers, in order to prevent disease and/or other infestations.
    The assembly and/or system can prevent standing and/or puddled water that can cause insect (mosquito) problems.
    The assembly and/or system can provide a certain air/water ratio that prevents fungi populations.
    The assembly need not include any organic materials that can potentially support weed, insect, and/or fungi populations.
  An intentional off-set of the seams of the assembly so that the seams of the assembly do not line up with the seams of the raised pavers.
    Either layer can be die-cut and/or interconnect (e.g., via 2 male sides and/or 2 female sides) to the same layer of adjacent panels while physically butting one panel against another. The seams of the assembly need not match the seams of the pavers. Thus, most and/or all of the water that falls through seams of the pavers can fall on the absorbing surface of the retention layer and not in between panels, as likely would be the case if the seams of the panels were not off-set from the seams of the pavers.
    Either layer can closely abut its adjacent pedestals, such as by substantially matching at least a portion of the curvature of the exterior circumferential surface of an/each adjacent pedestal.
  Multiple storm water targets can be met:
    There can be a minimum of 1 assembly and/or panel in between 4 pedestals. It is possible to add 1, 2, 3, 4, or more panels over the initial layer of panels, thereby increasing the water retention and/or water delay capacity of the complete system. The panels need not completely fill the space underneath the raised pavers, but instead can be arranged in the space to provide an air gap between the pavers and the topmost retentive layer, such that the pavers need not contact the topmost retentive layer, and/or such that the topmost retentive layer need not support the above pavers.

Such a system is described in U.S. patent application Ser. No. 15/481,663, which is incorporated herein by reference in its entirety and in its relevant parts.

Raised pavers can provide pedestrian access and or wind uplift protection on certain areas of a roof. The space underneath such raised pavers typically does not retain or detain (delaying) any storm water outflow. Yet ideal storm water systems can retain the majority of water-producing events (e.g., rain, snow, ice, hail, sleet, etc.), and/or ideally can cause a peak storm water delay that spreads out the amount of water that flows to the drains and into the cities infrastructure. Thus, civil engineers and/or architects might want to minimize paved spaces on roofs, because unlike green roofs, which can retain and delay storm water, the space underneath raised pavers does not inherently retain storm water; which can be a huge challenge in most densely populated areas.

Certain exemplary embodiments can provide storm water retention and/or peak flow delay.
  Retention Layer: cities can have specific retention standards that property owners have to adhere to in order to get a building permit. This retention layer can serve as an obstacle to substantially vertical flow to stormwater that flows between seams of the overhead pavers, retain as much water as possible, and/or create a vertical flow delay where the water has to travel through the vertical column of material, which is an intentional delay.
  Drainage Layer: this layer can cause a measurable delay laterally in transporting the water that percolated through the retention layer, underneath the panel assembly to the drains.

Storm events regularly come in groups of multiple water-producing events. In the summer most such events are rain events last an average of about 3 hours. In the winter, most water-producing events last on average about 24 hours, but within each average time period, there are periods of no rain, snow, etc. When a storm water retention system gets saturated on day 1, ideally it will drain or evaporate the water from itself in order to be able to accept the next water-producing event. If it cannot completely absorb the next storm, the drainage layer can create an obstacle to the lateral and/or horizontal water flow such that the water has to maneuver through physical obstructions in the drainage layer itself; which causes a time delay to the drain. Thus, certain exemplary embodiments can provide purposeful rapid dehydration of the system and/or at least some of its assemblies in order to ready itself for the next storm event.

In certain exemplary embodiments, the retention layer can be made of molten rock that is spun into fibers and needled into a matting format. This material is commonly called needled mineral wool. Usually, it has a density of about 130 kg/m$^3$, is approximately 1" thick, is UV-proof, cannot rot, has no organic materials to support fungi and/or disease, and/or has no chemical and/or organic binders that hold the fibers in place. By having free floating fibers there is no or little potential material instability due to freeze/thaw cycles from winter events. In a drained embodiment (such as can be the case with certain exemplary embodiments), the material has an approximately 70/20/10 ratio, which is 70% retained water, 20% air, and 10% fibers. This air/water ratio can prevent disease by avoiding anaerobic conditions. The absorption capacity of the mineral wool is virtually instant and roughly 95% of the water retained can be available for release through evaporation. Mineral wool can be 100% recyclable and/or can be worked into the landscape (like rock). Alternative materials for the retention layer can include binder-based Rockwool®, expanded open or closed cell foams (e.g., cellular glass, polyurethane foam, polyisocyanurate foam, polystyrene foam, polyethylene foam, etc.), etc., and/or the same material as the drainage layer, but perhaps in a substantially different form and/or density.

In certain exemplary embodiments, the drainage layer can be made from a variety of structures, such as panels, meshes, grids, mats, fabrics, and/or bundles. Those structures can be formed from any of a wide variety of materials, such as metals, plastics, rubber, polymers, and/or natural materials, such as wood, cotton, burlap, wool, coir, etc., and/or the same material as the retention layer, but perhaps in a substantially different form and/or density. Potential polymers can include ABS's, polyacetates, polyacrylics, alkyds, epoxies, flourothermoplastics, liquid crystal polymers, nylons, styrene acrylonitriles, polybutylene terephthalates, polycarbonates, thermoplastic elastomers, polyketones, polypropylenes, polyethylenes, polystyrenes, PVC's, polyesters, polyurethanes, thermoplastic rubbers, and/or polyamides, etc. The material can be provided as a stamped, forged, machined, welded, extruded, molded, knitted, woven, aligned, and/or unaligned panel, mesh, cloth, bundle, collection, and/or geotextile. Any fabric can be formed via weaving, knitting, pressing, and/or felting natural and/or synthetic fibers. A fabric can comprise closely spaced and/or intimately arranged intermeshed or unconnected fibers, strings, elements, strands, and/or elements that collectively can act as an entrapping, absorptive, and/or flow-resistive mechanical barrier to physically retain a fluid on its surfaces and/or in the spaces between the fibers, strings, elements, strands, and/or particles.

In certain exemplary embodiments, the drainage layer can be provided in any of a variety of thicknesses, such as from approximately 0.25 inches to approximately 1.5 inches, including each and every value and sub-range within than range. The drainage layer can be formed from a 3 dimensional plastic thread filament, a plastic cupped drainage layer, and/or even soil. A filter cloth can provide support for the layers (i.e., drainage and/or retention layer(s)) when they are laid on gravel and/or cupped drainage layers. The chosen drainage layer can provide adequate drainage in regards to lateral flow rate.

The retention layer and/or the drainage layer can be die-cut in the shape that allows the seams between panels to be off-set from the seams between pavers. The layers of a given panel usually but not necessarily are attached to one another with mechanical devices and/or glue. Each panel can be shipped assembled. When assembling the system, as the next set of raised pedestals is installed, prior to placing the paver, the installer can place a panel under the paver with the male tabs of the panel pointing underneath the prior placed pavers. Thus, the space between the 4 pedestals can allow for 1 panel. The panels can be configured to only properly fit together if the male tabs of all panels point into the same two directions. Multiple layers of panels can be installed, one over the other, to fill the void beneath the pavers to any desired degree, and/or to provide greater water retention/detention. Note that, for any given layer, the male tabs of every other panel in any given row (i.e., every other panel in a checkerboard fashion) can point in opposite directions.

Certain exemplary embodiments can retain, detain, and/or delay storm water that falls on top of a suspended assembly of pavers by catching this water underneath as it seeps in between the gaps between the pavers. Certain exemplary embodiments, when dry, can offer extra R-value to insulate the building when the temperatures are high or low.

Certain exemplary embodiments can provide pavers, such as those made of wood, steel, plastic, rubber, concrete, and/or other materials, that are installed on top of roofs for amenity space, walking surfaces, and/or wind uplift purposes.

Certain exemplary embodiments can fill a layer and/or portion of the void/cavity space underneath the pavers with a collection of substantially contiguous, abutting, and/or adjacent panels that are formed from a rapid water absorbent non-organic material that will not substantially wear, degrade, rot, mold, and/or be altered due to application of most basic household chemicals. Certain exemplary embodiments provide water retention/detention panels that are re-usable, recyclable, and/or formed from recycled materials.

In certain exemplary embodiments, the panels can increase the R-value of the roof. Each panel can comprise two or more layers that are attached to each other or installed in two steps as separate pieces. Each panel can comprise at least one drainage layer and/or at least one retention layer. Thus, a panel can be a single drainage layer, multiple drainage layers, a single retention layer, and/or multiple drainage layers.

The drainage layer can comprise a 3-dimensional formed plastic, a 3-dimensional filament, and/or natural gravel. The drainage layer can: allow the retention layer to breathe; transport excess water to the drain; cause a purposeful delay, and/or allow the system below to dry up between water-producing events.

The retention layer can comprise a sponge-like and/or water absorbing material that uses absorption to retain water. Certain exemplary embodiments use rock mineral wool, which is a rock-based fiber needled matting that can be obtained in a 1 inch thickness and/or a 130 kg/cubic meter density. The retention material can be substantially resistant to fire, rot, mold, insects, and/or substantial change in shape due to heat or cold. The retention material need not use binders that can potentially break the bonds between the fibers during a series of freeze/thaw cycles.

In certain exemplary embodiments, the panels can be placed underneath the pavers and between the pedestals. For each panel, two sides can be off-set so that the seams of the pavers above do not line up with the seams of the panels. The ends of one panel can be substantially adjacent and/or butt against (abut) the ends of adjacent panels. Multiple panels can be stacked on top of one another to double or triple the water absorption capacity. Each retention layer can have its own drainage layer, which can increase the rate of dehydration, thereby increasing the ability of the system to retain stormwater at the next storm event. The separation between retention layers that is created by the drainage layers can increase the water capacity of the retention layers by allowing air to be easily displaced from the retention layers during a high volume rain event.

As explained above, storm water can carry a substantial amount of pollutants to certain natural bodies of water. For example, storm water is the biggest source of pollution of the Chesapeake Bay. As federal, state, and local storm water volume and storm water quality regulations become more intentional and more specific, such as in regards to storm water volume and/or storm water performance (delay), city planners, building owners, civil engineers, architects, etc. can look for ways to retain and/or delay most or all of the storm water that falls on any given property and/or surface. Ideal storm water management systems can retain the majority of water-producing events (e.g., rain, snow, ice, hail, sleet, etc.), and/or ideally can cause a peak storm water delay that spreads out the amount of water that flows to the drains and into the storm water infrastructures Improved areas such as driveways, walkways, roofs, patios, and/or plaza decks typically are impermeable to water. To meet current and/or future stormwater regulations, this water can be to be intentionally retained and detained (delayed) from flowing to drains, storm sewers, and/or natural runoff conduits. On top of such impermeable surfaces, greenery, green systems, green roofs, and/or vegetated roofs can be built to retain and/or detain storm water, in addition to creating an aesthetically desirable space for people to enjoy.

For example, green roofs can be built and/or installed in-place by installing modular trays (hereinafter "trays"). Such trays are shown in U.S. Patent Application 62/319,528, which is incorporated by reference herein in its entirety and for its figures, drawings, illustrations, and photographs. Those trays can be easy to install and/or remove, particularly for smaller projects and/or when there is limited crane access to the roof. Tray-based approaches can combine the drainage layer, the retention capacity, the soil (or other plant growth media), and/or the vegetation into a system.

A tray can be placed on top of a retention layer (and thus the tray itself can be substantially water retention-free and/or non-retaining, and thereby of minimal and/or optimized weight) and/or a retention layer can be placed inside the tray. The retention layer can retain and/or detain storm water during a rain event, detain and/or slow down the transient outflow, and/or replace and/or eliminate a similar volume of growth media (soil) space, yet still provide a livable volume for roots and/or soil biology/ecology. The retention layer can, even in a saturated state, provide and/or allow sufficient air infiltration and/or flow to cause an oxygen level that is sufficient to sustain root development and/or a desired soil biology and/or ecosystem. When a retention layer is provided outside the tray, one or more spacers can be positioned external to the tray to provide a predetermined gap between the tray and a drainage layer, thereby preventing, minimizing, and/or reducing compression of the retention layer.

A tray can be a fully perforated box having 3 or more substantially vertically extending sides and/or walls and a substantially horizontally extending bottom. A tray can be formed in a manner that allows the perforations to be covered with a decomposable and/or biodegradable material (e.g., a biodegradable film and/or paper), such that upon adequate biodegradation, the perforations can eventually "open up" and/or become accessible such that roots, water, and/or soil organisms can move freely through the perforations and/or in a substantially horizontal and/or lateral direction. For example, the perforations can allow the roots to go through the tray and into any soil located below the tray without any substantial root disturbance, root stress, or rooting prevention that a tray with a substantially solid bottom would offer. The perforations can allow the roots to grow downward beyond the tray, utilizing a much deeper profile than the tray itself offers.

An exemplary tray can have a footprint that measures, for example, approximately 12" wide, approximately 12" long, and/or approximately 3" deep, but can be offered in sizes that range from approximately 2" to 8" in height, or in different footprint shapes and/or sizes, such as an equilateral triangular footprint having sides that are approximately 6" to approximately 16" long, a right triangular footprint having a base and height that are approximately 4" to 24" long, a square footprint measuring having sides measuring approximately 4" to approximately 36", a rectangular footprint measuring approximately 4" approximately 12"×approximately 6" to approximately 24", a hexagonal footprint having approximately 4" to approximately 24" long sides, and/or any other configurations that allow for creating a substantially contiguous and/or horizontally-abutting array of trays. A tray can include one or more internal vertical members that can create structural support. These vertical members and/or the bottom element can be solid or perforated. Clips, tabs, and/or male/female structures can be provided to attach a tray to the retention layer and/or another roof component to resist wind-uplift issues.

A tray can be purposefully designed to have a 12"×12" and/or square foot print in order to minimize the structural requirements of the tray yet still be able to withstand the load when fully loaded with growth media and/or plants. The 12"×12" footprint can get most of its structural strength from the corners of the tray. The relatively short 12" spans of the sidewalls can decrease and/or minimize tensions and/or structural loads on these walls, and/or decrease and/or minimize the amount of material needed to construct the tray.

One or more walls and/or the bottom of the tray can be perforated to allow release of water while holding plants and/or growth media (e.g., soil). A tray need not have a retention layer or a drainage layer.

A tray can rest on and/or be supported by an external retention layer that can rest on and/or be supported by a drainage layer.

A tray can contain a fabric type retention layer (e.g., needled mineral wool or another retention layer material as described herein) that lays on the bottom of the tray, but the tray need not have a drainage layer installed within the tray. The retention layer can have the same or improved rooting, water retention, and/or detention characteristics as growth media, and therefore can serve as a substitute for growth media. Thus, with this approach, the retention layer within the tray can replace at least a portion of the volume that would be occupied by growth media. Thus, for example, a substantially dry 1 inch high retention layer that weighs, for example, approximately 0.5 pounds per square foot to approximately 1 pound per square foot can replace a 1 inch high soil layer that weighs, for example, approximately 4 pounds per square foot to approximately 6 pounds per square foot, thereby resulting in considerable weight, labor, trucking, craning, and/or installation savings.

A tray can have a drainage layer located within the tray and adjacent the bottom of the tray, the drainage layer supporting a retention layer. A tray can have a drainage layer located outside the tray and adjacent the bottom of the tray.

A tray can be considered to be a layer of an assembly. That assembly can utilize separate and/or external drainage and/or retention layers. The retention layer and/or the drainage layer can be existing and/or supplied by others.

A tray can provide extensive flexibility in the design of a green roof system. A tray can be planted with, for example, Sedum, succulents, grasses, and/or perennials as a "Built-In-Place" (BIP) concept, meaning the drainage/retention layers, the soil, and/or the plants (cuttings, plugs, potted plants, and/or sedum blankets) can be installed and/or combined on location (i.e., in situ). Plants having a thin root profile can be planted, grown, shipped, and/or re-planted in soil profile ranging from approximately 0.25" to approximately 1" (e.g., similar to Sedum blankets), while other plants, such as certain natives and other non-Sedum-like plants, can utilize a deeper soil profile for planting, growing, shipping, and/or installing.

The plants of any tray can be grown at a nursery or the like, and/or shipped to the job site such that the tray is fully vegetated. A tray can be installed on top of an existing drainage and/or retention board, panel, and/or layer of soil and/or green roof substrate/media. Any portion of a roof can be planted with such trays. Growth media can be applied to fill a tray and/or can be wrapped and/or applied around a tray to create a continuous vegetated area. The fully vegetated format can protect the soil quality of the green roof system and/or deter and/or prevent sheet flow of stormwater across the soil and/or tray.

A tray also can be utilized in a BIP approach where empty trays are placed on the roof and then filled with growth media.

To prevent growth media from spilling from and/or otherwise inadvertently leaving the perforated tray during handling and transport, the tray can utilize a decomposable and/or biodegradable lining, such as a paper, film, and/or fabric, that can be secured, wrapped, and/or attached, such as via the weight of the retention layer and/or soil, tension, shrink-wrapping, and/or a glue or other adhesive, to the inside and/or the outside of the tray. This lining can decompose, biodegrade, and/or disintegrate within approximately 1 day to approximately 12 months. Roots and/or water can move freely through this lining. This lining can extend above the height of the tray to effectively make the walls of the tray taller and thereby, upon degradation and/or disintegration of the lining, the plants in the tray can present a higher profile (by e.g., approximately 0.25" to 1") than if the walls weren't originally present when the tray was planted. Thereby, when a closely positioned array of trays is installed, the tall plant profile can substantially hide and/or obscure the visibility of the top edge and/or walls of the tray.

To address wind-uplift concerns on the roof, each tray can utilize a plastic clip and/or tab that can be molded into the tray and/or manually inserted after the tray is finished with vegetation. This clip and/or tab can provide a horizontal and/or vertical male protrusion that can slide into an available horizontal and/or vertical female slot and/or opening of an adjacent and/or neighboring tray, such as upon final installation of the trays on the roof. Each tray can have and/or utilize 1 or more clips and/or tabs. For example, a tray can utilize 2 clips or tabs, one per side of 2 adjacent sides of the tray, and thereby allow easy positioning and/or assembly of an array of trays. A clip and/or tab can be approximately 1" to 4" wide with rounded corners when looked upon from above. Alternatively, a clip and/or tab can be approximately 1" to 4" tall with rounded corners when looked upon from the side. Alternatively clip and/or tab can extend in a substantially vertical plane and/or can have a substantially vertically-extending triangular and/or wedge shape that is connected to and/or integral in an upper tray, the shape configured to releasably lockably fit within a substantially vertically-extending slot of a lower tray when the upper tray is lowered onto the lower tray, thereby substantially locking the two trays together. A clip can include a knob or otherwise raised portion that, once the clip is installed, can prevent the clip from backing-out of, and/or easily being removed from, the tray wall into which the clip and knob have been inserted and/or installed.

A tray can be grown with the soil surface of the vegetation below and/or even with the height of the vertical walls of the tray. Prior to shipping, the tray can be turned over to remove the internal volume of the soil and root mass. Next, a substantially dry and/or lightweight retention layer can be inserted into the bottom of the tray prior to sliding the soil and root mass back into the tray, such that the soil and root mass can rise a portion of and/or a substantially equal height as the height of the inserted retention layer, such that the profile of the soil and/or root mass extends above the top of the tray. This arrangement can create a substantially seamless green roof as the installed trays need not have top edges that are visible upon installation or beyond. This method of including the substantially dry retentive layer at the last moment prior to shipping can result in a purposefully lighter method of shipping the green roof trays to a job site. This in turn can allow the shipper to load extra materials onto the truck, which can result in purposeful freight savings.

If plants are grown in a tray at the nursery, there need not be a retention layer inside the tray. If plants are grown in a tray at the nursery, the soil and/or growth media profile can be partially exposed, extending, for example, approximately 0.25" to approximately 1" above the top edge of the tray, thereby providing an appearance of no seams between trays, such that the vegetation appears to be seamless. The growth media can improve, maximize, and/or optimize water retention through its soil structure and/or optimized soil biology.

In the field, additional edge supports and/or extenders can be clipped on the edges of the tray at a designated spacing to create a temporary raised profile that can prevent the growth media from being applied unevenly and/or can prevent the growth media from flowing and/or falling past the edges of the tray. These temporary edges can be used only at the nursery and/or can function as guides to ensure proper leveling and/or an even soil profile across a tray and/or a group of trays. Prior to shipping, nursery workers can use cutters or knives to vertically separate roots and/or plants that share more than one tray. This can create a tray with a raised growth media profile that is approximately 0.25 to approximately 1" above the tray edge. Once installed, these trays can create a seamless green roof as the installed trays need not present visible edges upon installation or beyond.

The retention layer in the tray or the retention layer placed underneath the tray can be made of needled mineral wool or other storm water retentive materials. The retention layer can rest directly on top of and/or be supported by a drainage layer, either of which can be existing and/or supplied and/or owned by others.

A tray-based green roof assembly can utilize purposeful retention and/or detention delay strategies by breaking up the retention layers into two or more separate retention segments stacked on top of one another but separated by a drainage layer. This purposefully can cause a delay in the peak flow of a green roof assembly. First, the uppermost retention layer can fill up with water. Because this upward retention layer can be separated from the retention layer below it by a drainage layer (which also allows air flow), the uppermost retention layer can first fill up itself, prior to releasing any water to the next retention layer below it. This can result in an intentional delay. Thus, trays have the option to utilize not only retention layers as a retention device to maximize retention, but also can utilize or be comprised of a stack of multiple retention layers, each separated by a drainage layer, with the additional intent to purposefully slow down the release of water from the assembly and thereby effect and/or improve the peak flow release time from the system.

A tray can have adjustable heights for its walls through the method of adding "rings" or wall extenders to increase the height. The rings can, but need not be, removable prior to shipping. Such a tray design can allow the green roof system designer to place different retention materials, such as mineral wool or other products that retain, in different volumes, densities, and/or thicknesses that support root growth, to be placed in or underneath the system. This can allow the green roof designer to decide to either retain and/or detain less water or if one choses to do so, more water, in order to match or exceed local storm water regulations.

The retention layer can:
purposefully rapidly absorb a certain amount of storm water; and/or
purposefully delay the vertical water flow (Saturated Conductivity Flow rate).

The drainage layer can:
allow excess water to drain out of the retention layer and/or cause a purposeful delayed flow to the drains; and/or
ensure rapid absorption. In order for the retention layer to more readily accept water into the retention layer, the empty pore air space in the mineral wool, when dry, can be freely replaced with water. The drainage layer can help facilitate this by allowing the water to push out the air in the mineral wool layer (if, retention layer is used without the drainage layer, the system likely will not absorb water as rapidly).

Purposeful rapid dehydration of the assembly in order to ready itself for the next storm event: The assembly (and/or system of which it is a component) can be designed to maximize water retention, delay storm water outflow to the drains, and/or dehydrate rapidly through the use of airflow that can take place through the purposeful design of the assembly.

- Retention layer: The storm water retention layer can release water readily through evaporation.
- Drainage layer: The drainage layers under and/or in between the storm water retention layers can allow and/or encourage airflow under and/or in between the retention layers. This can have multiple benefits, including:
  - The assembly and/or system can be ready sooner, with renewed capacity, for the next storm event.
  - The assembly and/or system can ensure rapid dehydration. In order for the retention layer to release water through evaporation from the retention layer, the water filled pore space in the mineral wool, when saturated/wet, can be replaced with air. The drainage layer can facilitate that by allowing the upward evaporating water to pull up air freely into the retention layer. A retention layer used without a drainage layer typically will not dehydrate water as rapidly.
- The retention layer and the drainage layer can be repeated and are used to intentionally to separate the retention layer from the drainage layer to increase the water storage capacity of the full assembly, and the increased detention and peak flow delay that the complete assembly incurs when additional retention and drainage layers are applied under the complete assembly.

To create conditions that prevent moisture related infestations:

- The drainage layers under and/or in between the storm water retention layers can allow and/or encourage airflow under and/or in between the retention layers, in order to deter and/or prevent the growth of pathogens and/or other infestations.
- The assembly and/or system can prevent standing and/or puddled water that can cause insect (mosquito) problems.
- The assembly and/or system can provide a certain air/water ratio that prevents fungi populations.
- The assembly need not include any organic materials that can potentially support weed, insect, and/or fungi populations.

Certain exemplary embodiments can provide storm water retention and/or peak flow delay.

- Retention Layer: cities can have specific retention standards that property owners have to adhere to in order to get a building permit. This retention layer can retain as much water as possible and/or create a vertical flow delay where the water has to travel through the vertical column of material, which is an intentional delay.
- Drainage Layer: this layer can cause a measurable delay laterally in transporting the water that percolated through the retention layer, underneath the panel assembly to the drains.

Storm events regularly come in groups of multiple water-producing events. In the summer most such events are rain events last an average of about 3 hours. In the winter, most water-producing events last on average about 24 hours, but within each average time period, there are periods of no rain, snow, etc. When a storm water retention system gets saturated on day 1, ideally it will drain or evaporate the water from itself in order to be able to accept the next water-producing event. If it cannot completely absorb the next storm, the drainage layer can create an obstacle to the lateral water flow (e.g., sheet flow) such that the water has to maneuver through physical obstructions in the drainage layer itself; which causes a time delay to the drain. Thus, certain exemplary embodiments can provide purposeful rapid dehydration of the system and/or at least some of its assemblies in order to ready itself for the next storm event.

A tray can be made of any suitable plastic and/or polymer, the material selected for, e.g., adequate strength, light weight, low cost, recyclability, etc. Potential polymers can include ABS's, polyacetates, polyacrylics, alkyds, epoxies, flourothermoplastics, liquid crystal polymers, nylons, styrene acrylonitriles, polybutylene terephthalates, polycarbonates, thermoplastic elastomers, polyketones, polypropylenes, polyethylenes, polystyrenes, PVC's, polyesters, polyurethanes, thermoplastic rubbers, and/or polyamides, etc. The polymer can be a compostable "plastic" material, such as certain starch- or plant-based materials.

The retention layer can be made of molten rock that is spun into fibers and needled into a matting format. This material is commonly called needled mineral wool. Usually, it has a density of about 130 kg/m$^3$, is approximately 1" thick, is UV-proof, cannot rot, has no organic materials to support fungi and/or disease, and/or has no chemical and/or organic binders that hold the fibers in place. By having free floating fibers there is no or little potential material instability due to freeze/thaw cycles from winter events. In a drained embodiment (such as can be the case with certain exemplary embodiments), the material has an approximately 70/20/10 ratio, which is approximately 70-80% retained water, approximately 15-20% air, and approximately 5-10% fibers. This air/water ratio can prevent disease by avoiding anaerobic conditions. The absorption capacity of the mineral wool is virtually instant and roughly 95% of the water retained can be easily available to be utilized by the plant, or can be easily available for release through evaporation. Mineral wool can be substantially 100% recyclable and/or can be worked into the landscape (like rock). Alternative materials for the retention layer can include binder-based Rockwool®, mineral wool, glass wool, expanded open or closed cell foams (e.g., cellular glass, polyurethane foam, polyisocyanurate foam, polystyrene foam, polyethylene foam, rubber foam, and/or organic materials such as sheep wool and/or fur, etc., and/or the same material as the drainage layer, but perhaps in a substantially different form and/or density.

In certain exemplary embodiments, the drainage layer can be made from a variety of structures, such as panels, meshes, grids, mats, fabrics, and/or bundles. Those structures can be formed from any of a wide variety of materials, such as metals, plastics, rubber, polymers, and/or natural materials, such as wood, cotton, burlap, wool, coir, etc., and/or the same material as the retention layer, but perhaps in a substantially different form and/or density. Potential polymers can include ABS's, polyacetates, polyacrylics, alkyds, epoxies, flourothermoplastics, liquid crystal polymers, nylons, styrene acrylonitriles, polybutylene terephthalates, polycarbonates, thermoplastic elastomers, polyketones, polypropylenes, polyethylenes, polystyrenes, PVC's, polyesters, polyurethanes, thermoplastic rubbers, and/or polyamides, etc. The material can be provided as a stamped, forged, machined, welded, extruded, molded, knitted, woven, aligned, and/or unaligned panel, mesh, cloth, bundle, collection, and/or geotextile. Any fabric can be formed via weaving, knitting, pressing, and/or felting natural and/or synthetic fibers. A fabric can comprise closely spaced and/or intimately arranged intermeshed or unconnected fibers, strings, elements, strands, and/or elements that collectively can act as an entrapping, absorptive, and/or flow-resistive mechanical barrier to physically retain a fluid on its surfaces and/or in the spaces between the fibers, strings, elements, strands, and/or particles.

In certain exemplary embodiments, the drainage layer can be provided in any of a variety of thicknesses, such as from approximately 0.125 inches to approximately 1.5 inches. The drainage layer can be formed from a 3-dimensional plastic thread filament, a plastic cupped drainage layer, and/or even gravel. A filter cloth can provide support to the retention layer panels as they are laid on soil, gravel, and/or a cupped drainage layer, thereby helping to retain the shape of the retention layer. The chosen drainage layer can provide adequate drainage in regards to lateral flow rate.

The retention layer and/or the drainage layer can be die-cut into panels having nearly any closed polygonal shape, such as a triangle, square, rectangle, hexagon, etc. The selected shape can allow gaps between the panels to be offset from the gaps between trays. The layers of a given panel usually but not necessarily are attached to one another with mechanical devices and/or glue. Each panel can be shipped assembled. Multiple layers of panels can be installed, one over the other, to any desired degree, and/or to provide greater water retention/detention. When multiple layers of panels are installed, gaps between panels of a subsequent layer can be offset from those of a lower layer of panels. Panels can be easily cut to accommodate penetrations such as pipes, chimneys, etc. that extend from below the surface the panels are placed on.

Certain exemplary embodiments can retain, detain, and/or delay storm water that falls on top of a planted assembly of trays by catching excess water underneath the trays as it seeps in between the gaps between the trays and/or out of perforations in the trays. Certain exemplary embodiments, when dry, can offer extra R-value to insulate the building when the temperatures are high or low.

Certain exemplary embodiments can support one or more trays with a substantially contiguous collection of panels that are formed from a rapid water absorbent non-organic material that will not substantially wear, degrade, rot, mold, and/or be altered due to application of most basic household chemicals. Certain exemplary embodiments provide water retention/detention panels can be re-usable, recyclable, and/or formed from recycled materials.

In certain exemplary embodiments, the panels can increase the R-value of the roof. Each panel can comprise two or more layers that are attached to each other or installed in two steps as separate pieces. A panel can comprise one or more drainage layers and/or one or more retention layers.

The drainage layer can comprise a 3-dimensional formed plastic, a 3-dimensional filament, and/or natural gravel. The drainage layer can: allow the retention layer to breathe; transport excess water to the drain; cause a purposeful delay, and/or allow the system below to dry up between water-producing events.

The retention layer can comprise a sponge-like and/or water absorbing material that uses absorption to retain water. Certain exemplary embodiments use rock mineral wool, which is a rock-based fiber needled matting that can be obtained in a thickness ranging from approximately 0.25" to approximately 4 inches and/or a density from approximately 25 kg/cubic meter to approximately 400 kg/cubic meter. The retention material can be substantially resistant to fire, rot, mold, insects, and/or substantial change in shape due to heat or cold. The retention material need not use binders that can potentially break the bonds between the fibers during a series of freeze/thaw cycles.

The panels can be placed underneath the trays and/or within the trays. The ends of one panel can butt against the ends of adjacent panels. Multiple panels can be stacked on top of one another to increase the water absorption capacity. Each retention layer can have its own drainage layer, which can increase the rate of dehydration, thereby increasing the ability of the system to retain stormwater at the next storm event. The separation between retention layers that is created by the drainage layers can increases the water capacity of the retention layers by allowing air to be easily displaced from the retention layers during a high volume rain event.

FIG. 1 is a perspective view of an exemplary embodiment of a water management system 1000, which can comprise a tray 1100 that can serve to constrain plant growth media (not shown). Tray 1100 can have and/or define a plurality of sides 1200, an open top 1300, and/or a bottom 1400. Sides 1200 can be planar, and/or align to extend in a substantially vertical manner. Top 1300 can be completely or partially open. Bottom 1400 can be a closed polygon having any number of sides, the sides of bottom 1400 defining a location of sides 1200. Tray 1100 can exist in a Cartesian coordinate system defined by three orthogonal axes, such as an X, Y, and Z axis, which can correspond to a width (W), height (H), and length (Z) dimension of tray 1100.

Figure 2:
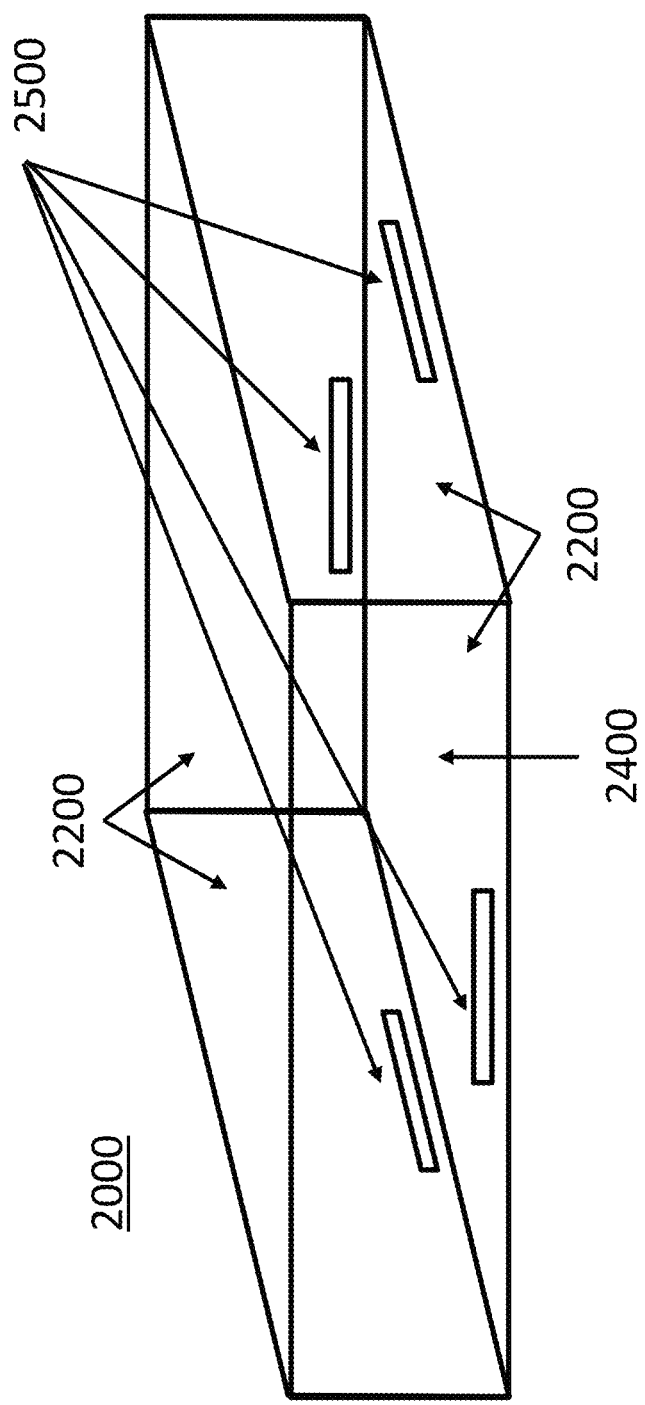
FIG. 2 is a perspective view of an exemplary embodiment of a tray of a water management system.

FIG. 2 is a perspective view of an exemplary embodiment of a water management system 2000, which can comprise a tray 2100 having a plurality of sides 2200 and a bottom 2400. In FIG. 2, sides 2200 are shown as transparent so that bottom 2400 is visible. Tray 2000 can define a plurality of female slots, passages, and/or apertures 2500 that can be configured to receive a male aligner and/or wind uplift resistor, such as a tab, block, and/or clip.

Figure 3A:
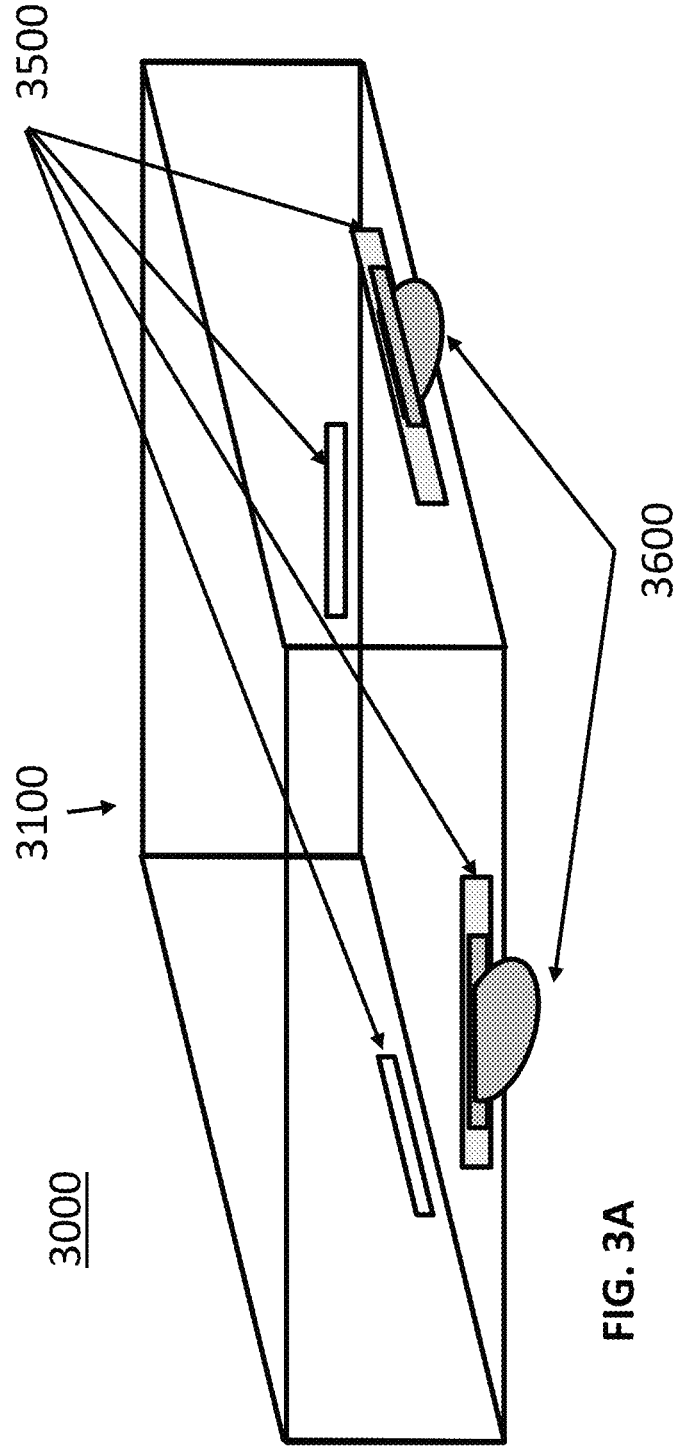
FIG. 3A is a perspective view of an exemplary embodiment of a tray of a water management system.

FIG. 3A s a perspective view of an exemplary embodiment of a water management system 3000, which can comprise a tray 3100 having a plurality of sides and a bottom. Tray 3000 can define a plurality of female apertures 3500 that each can be configured to receive a male aligner 3600.

Figure 3B:
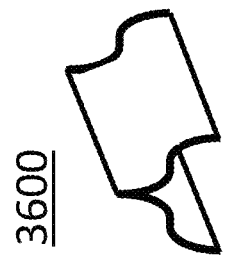
FIG. 3B is a top view of an exemplary embodiment of a tray aligner.
Figure 3C:
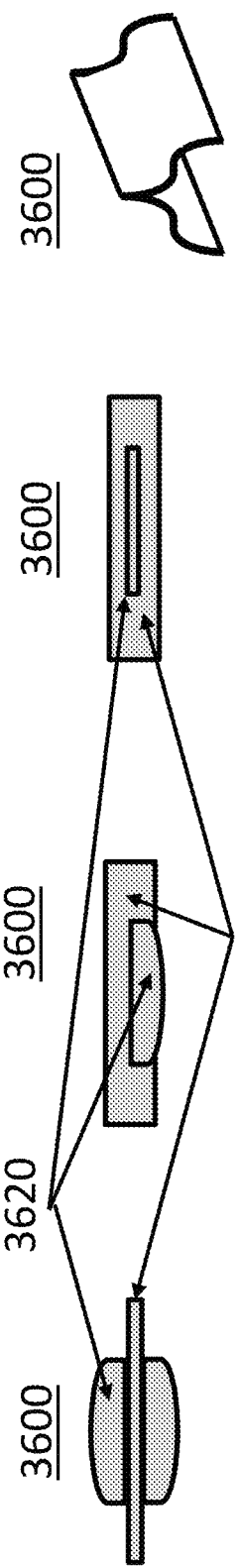
FIG. 3C is a perspective view of an exemplary embodiment of a tray aligner.
Figure 3D:
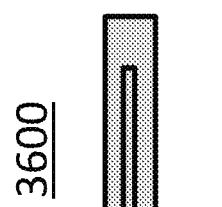
FIG. 3D is a front view of an exemplary embodiment of a tray aligner.
Figure 3E:
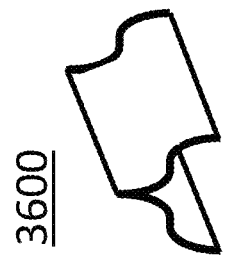
FIG. 3E is a perspective view of an exemplary embodiment of a tray aligner.

FIG. 3B is a top view, FIG. 3C is a perspective view, FIG. 3D is a front view, and FIG. 3E is a perspective view, of an exemplary embodiment of a tray aligner 3600, which can be configured to resist wind uplift, which might move tray(s) 3100 vertically upward, and/or horizontal loads, which might move tray(s) 3100 horizontally. Tray aligner 3600 can comprise one or more protrusions, clips, and/or tabs 3620, which can be configured to be inserted into apertures 3500 (see FIG. 3A) of adjacent, abutting, and/or neighboring trays 3100, thereby helping to align and/or position those trays with respect to each other. Tray aligner 3600 can comprise a resistor 3640, which can be configured to connect to tab(s) 3620, extend substantially perpendicular to tab(s) 3620, and/or substantially prevent tray aligner 3600 from being pulled out of tray(s) 3100. Resistor 3640 can be configured in various manners, such as one or more plates, pins, humps, and/or dimples having an effective vertical dimension that is greater than an effective vertical dimension of adjacent tray apertures 3500. Alternatively or additionally, apertures 3500 and/or tabs 3620 can be oriented vertically, such that resistor 3640 has an effective horizontal dimension that is greater than an effective horizontal dimension of adjacent tray apertures 3500. The functions of tab(s) 3620 and resistor 3640 can be integrated into a single unitary and/or monolithic part where tab(s) 3620 are not visually discernable from resistor 3640. For example, tray aligner 3600 can resemble a plate and/or planar structure that has been bent and/or re-formed to have a serpentine cross-section that will resist the pulling of aligner 3600 out of aperture(s) 3500 in a single and/or solely horizontal direction, yet can be wiggled and/or threaded horizontally and/or vertically through aperture(s) 3500 to substantially snuggly install tray aligner 3600 in aperture(s) 3500 or remove tray aligner 3600 from aperture(s) 3500 following a twisting and/or undulating path.

Figure 4:
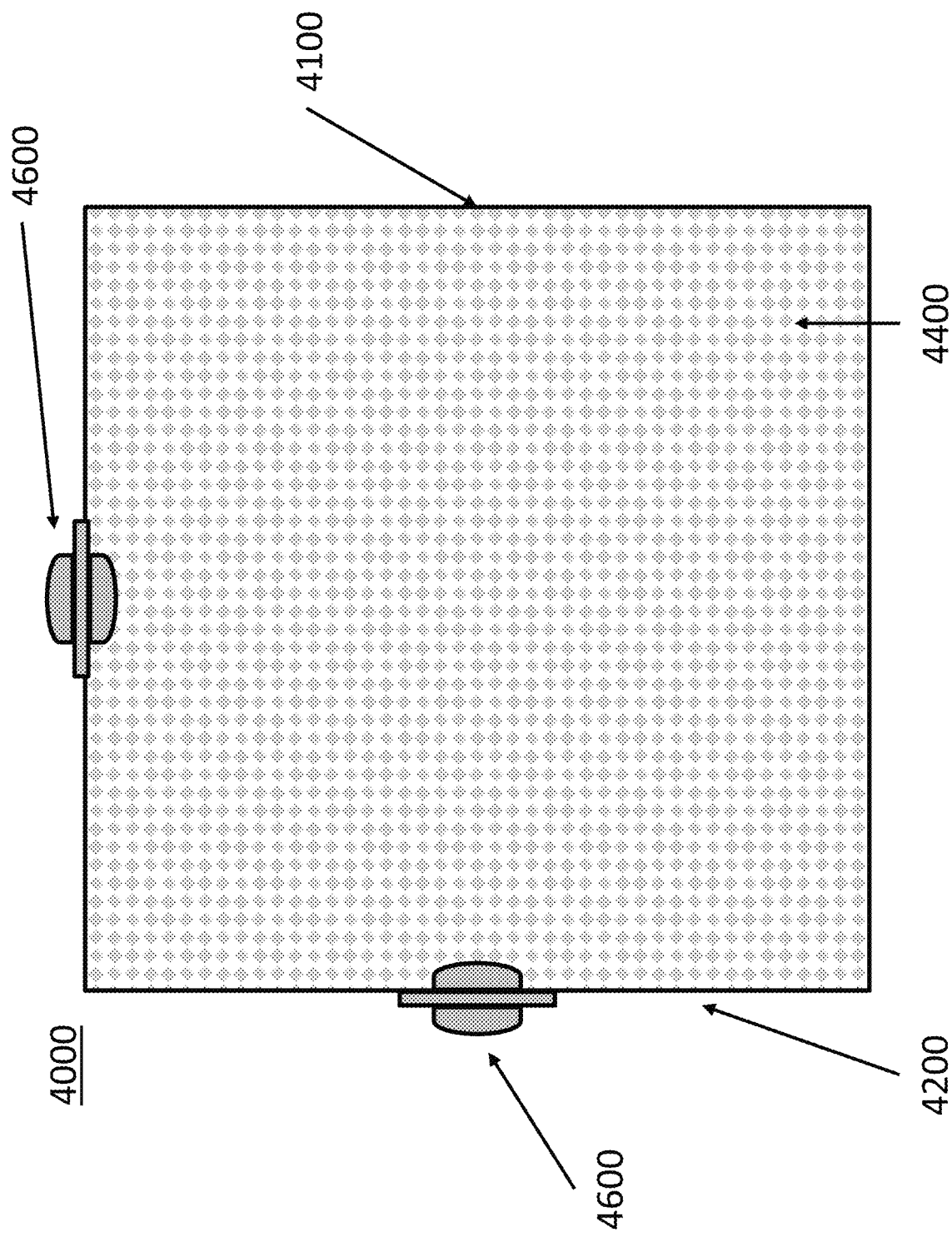
FIG. 4 is a top view of an exemplary embodiment of a water management system.

FIG. 4 is a top view of an exemplary embodiment of a water management system 4000, showing a tray 4100 having a visible bottom 4400 and sides 4200, along with tray aligners 4600 extending through apertures (not visible) in two or more sides 4200.

Figure 5:
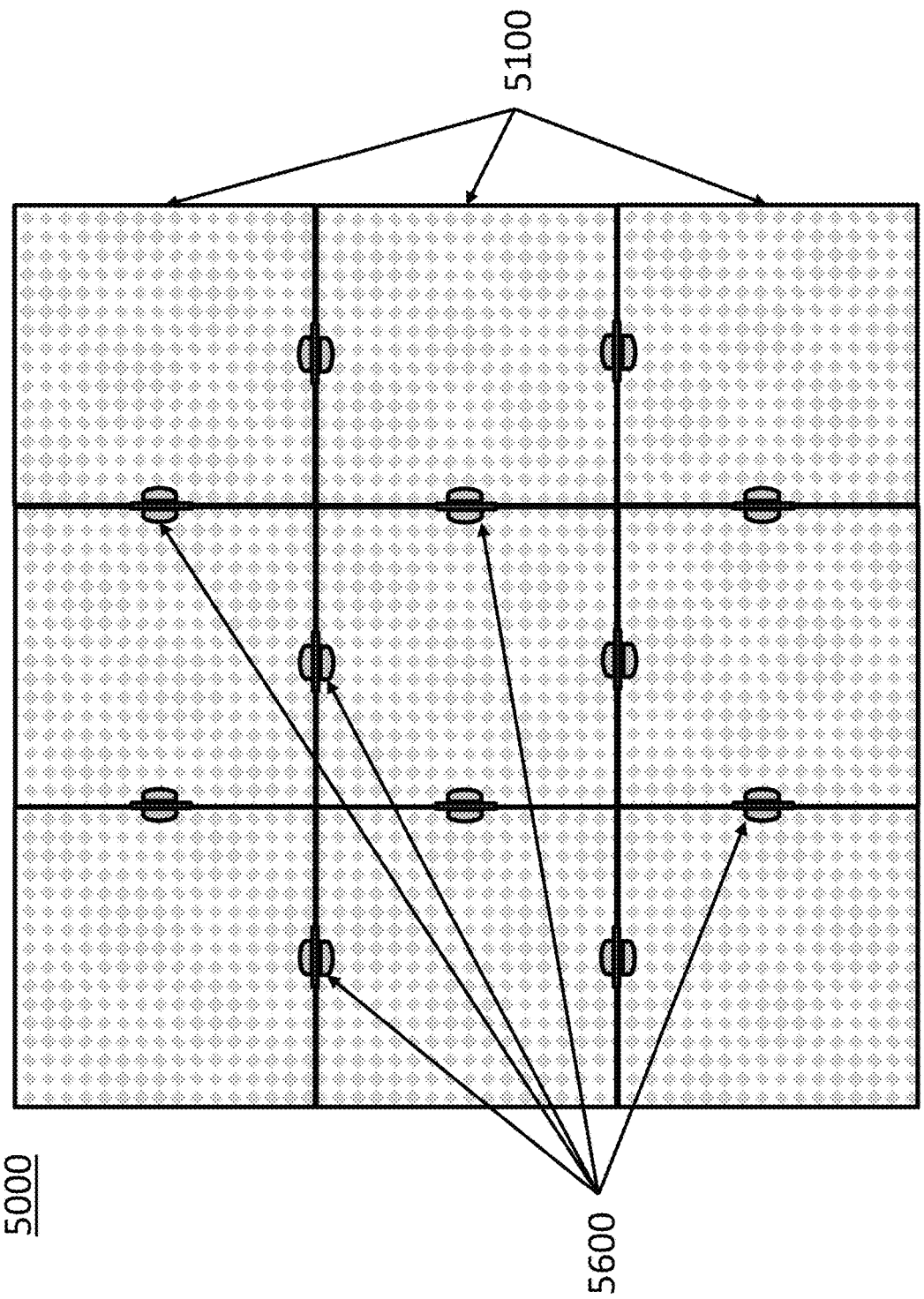
FIG. 5 is a top view of an exemplary embodiment of a water management system.

FIG. 5 is a top view of an exemplary embodiment of a water management system, showing an abutting array of trays 5100, where adjacent trays are connected and/or aligned using tray aligners 5600.

Figure 6:
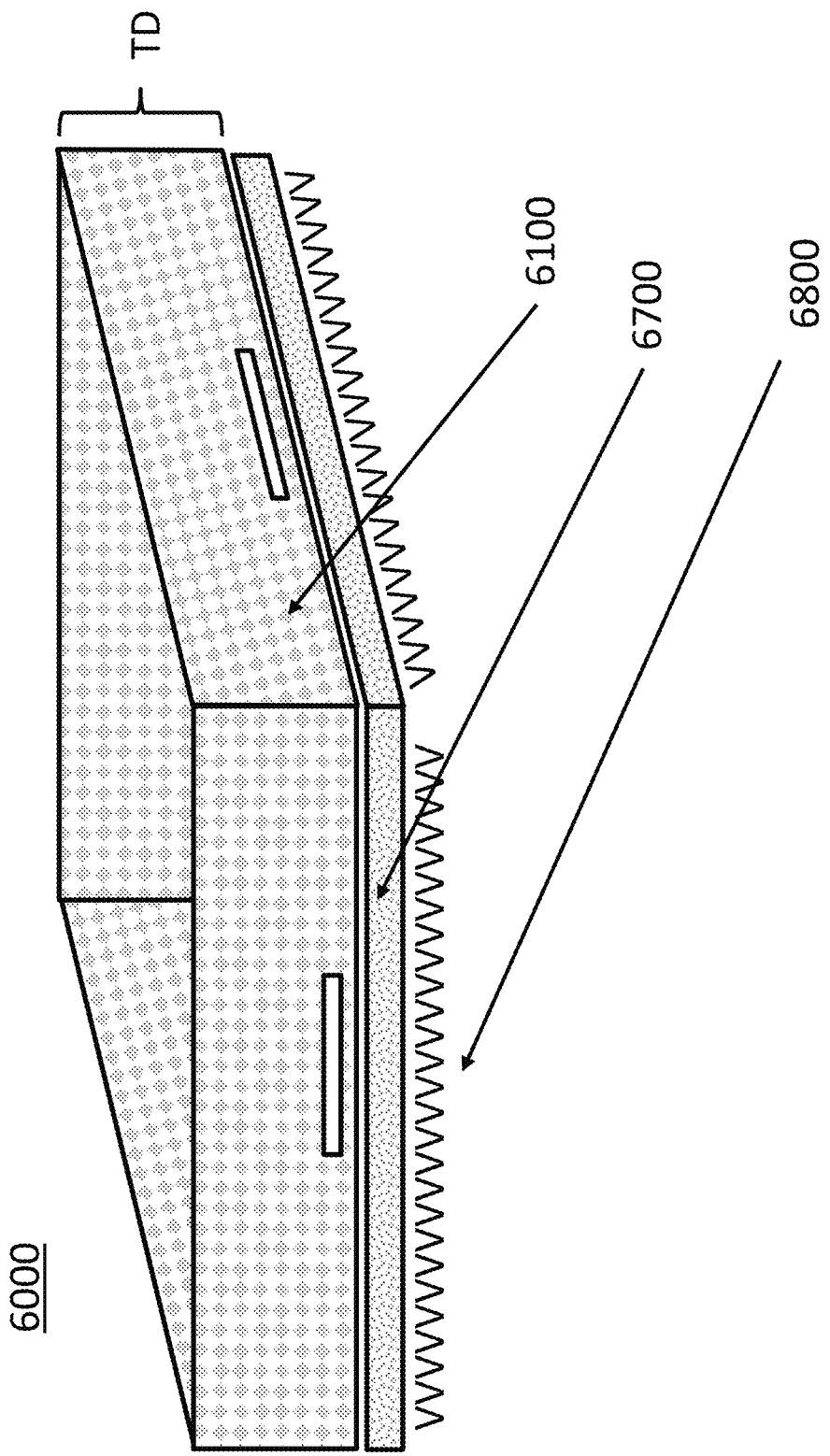
FIG. 6 is a perspective view of an exemplary embodiment of a water management system.

FIG. 6 is a perspective view of an exemplary embodiment of a water management system, showing a tray 6100, which can be supported and/or located above a water retention layer 6700, which itself can be supported and/or by a drainage layer 6800. Note that both retention layer 6700 and drainage layer 6800 are located outside tray 6100, such that the full depth TD of tray 6100 is available for the installation of plant growth media and/or plants inside tray 6100.

Figure 7:
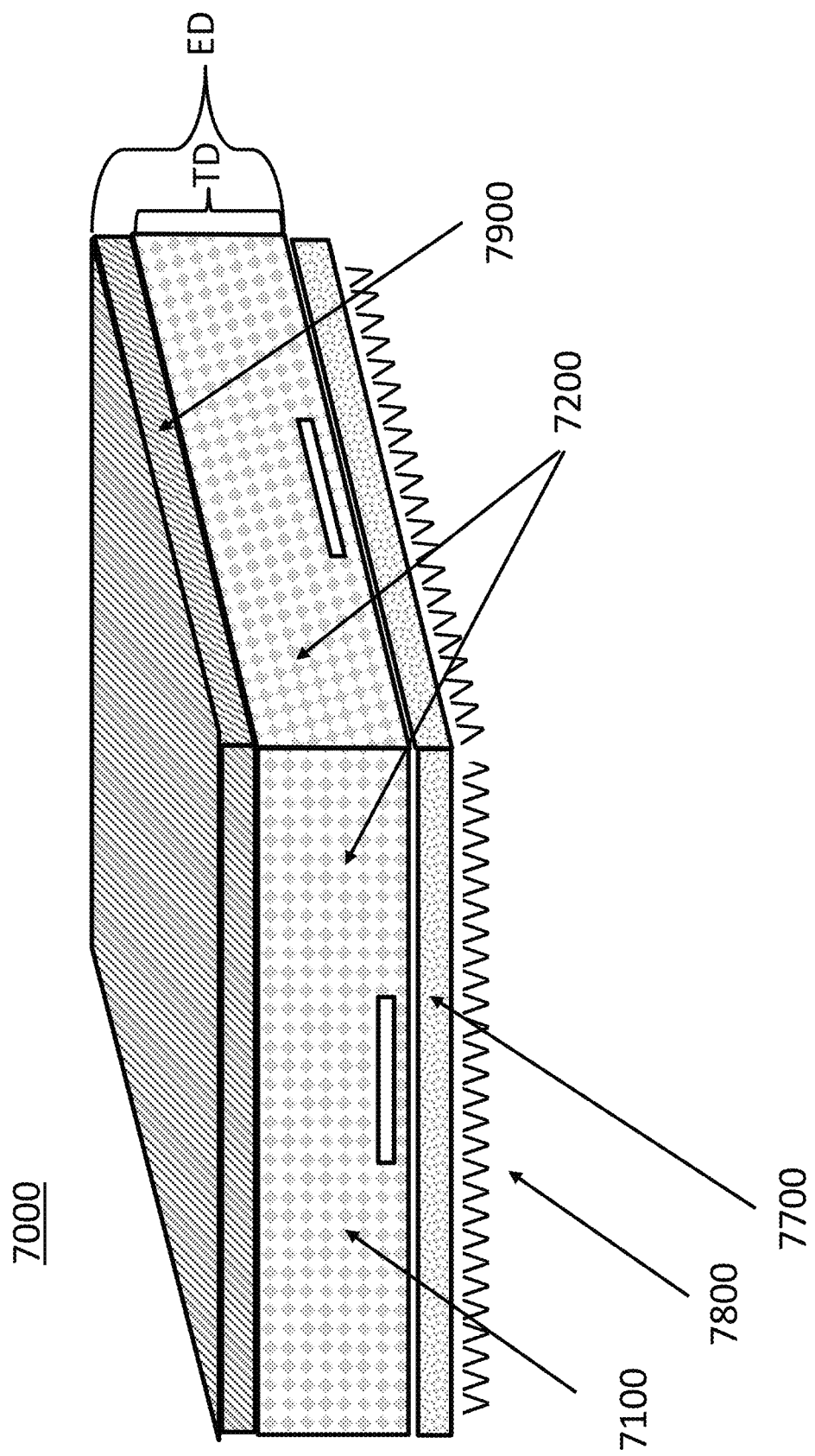
FIG. 7 is a perspective view of an exemplary embodiment of a water management system.

FIG. 7 is a perspective view of an exemplary embodiment of a water management system 7000, showing a tray 7100, which can be supported and/or located above a water retention layer 7700, which itself can be supported and/or by a drainage layer 7800. Plant growth media 7900 can extend above the top of sidewalls 7200 of tray 7100, such that the effective depth ED of tray 7100 (at least from a plant's perspective) can be greater than the actual depth TD of tray 7100.

Figure 8:
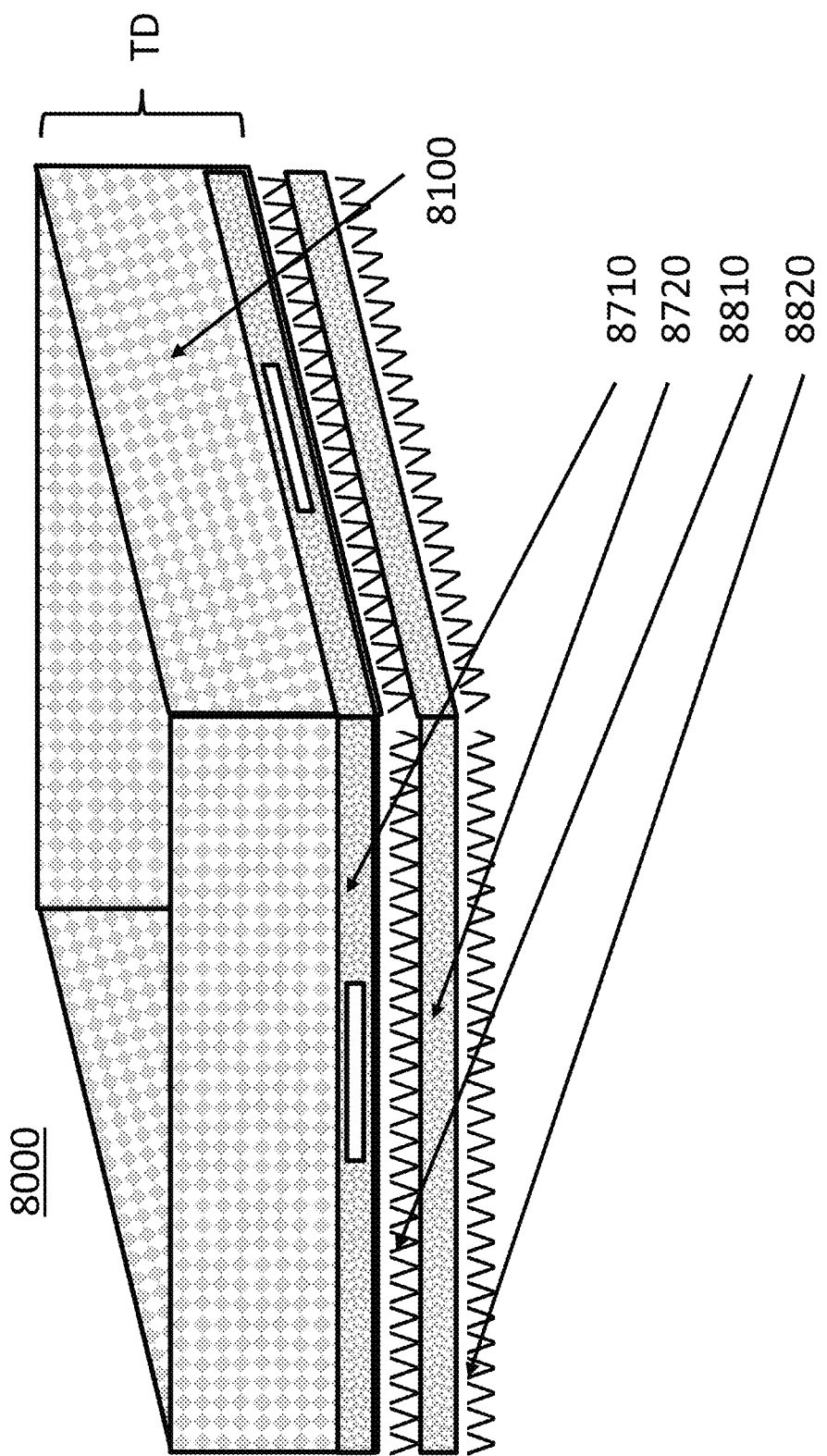
FIG. 8 is a perspective view of an exemplary embodiment of a water management system.

FIG. 8 is a perspective view of an exemplary embodiment of a water management system 8000, showing a tray 8100, which can contain a first water retention layer 8710, thereby lessening the effective depth ED of tray 8100 that is available for plant growth media. Tray 8100 can be supported by a first drainage layer 8810. A second retention layer 8720 can be located outside of tray 8100 and/or can support tray 8100. Second retention layer 8720 can itself be supported by second drainage layer 8820. In this manner, any number of retention layers and any number of drainage layers can be located inside or outside of tray 8100.

Figure 9:
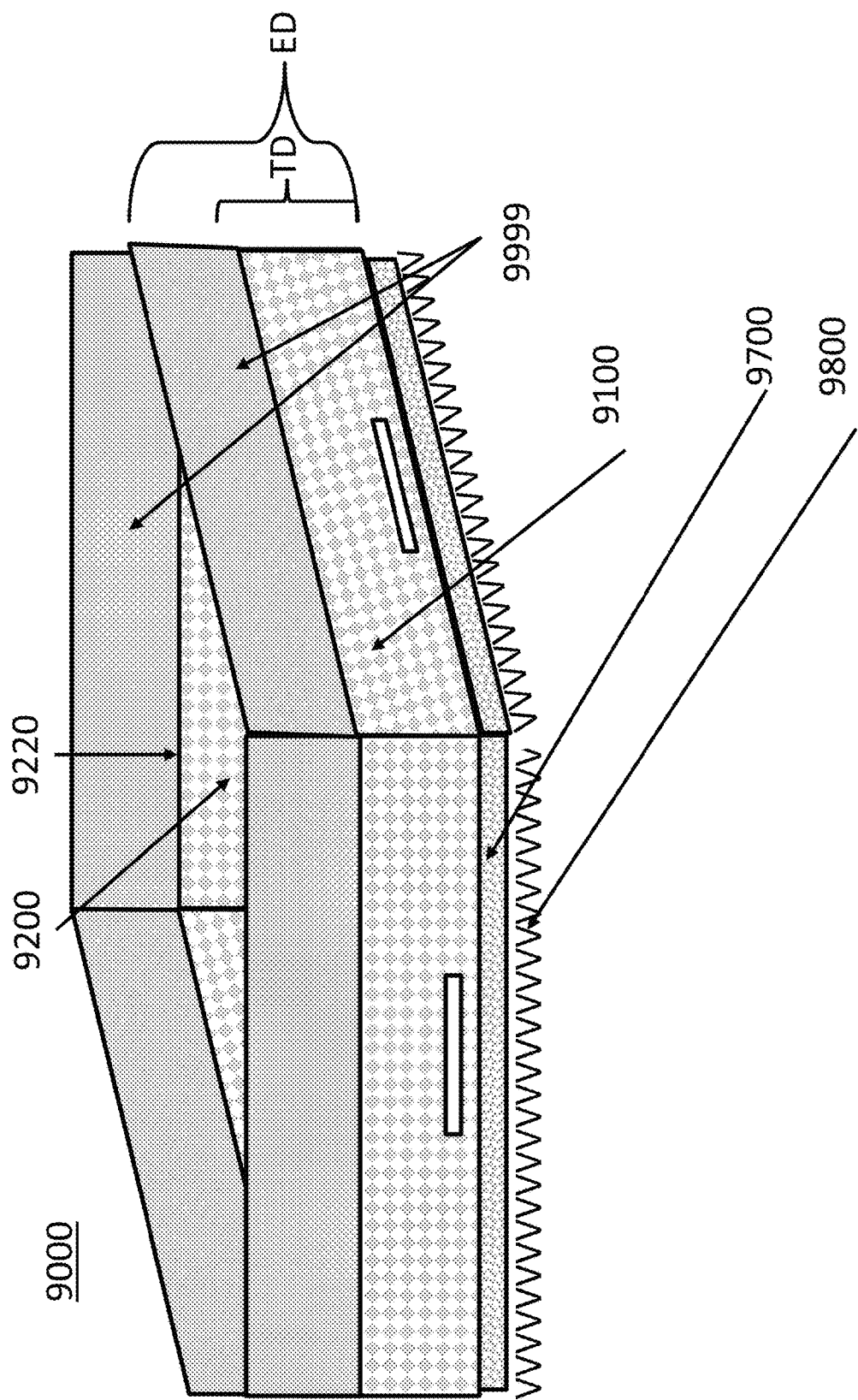
FIG. 9 is a perspective view of an exemplary embodiment of a water management system.

FIG. 9 is a perspective view of an exemplary embodiment of a water management system 9000, showing a tray 9100, which can be supported by a water retention layer 9700, which itself can be supported by a drainage layer 9800. Sidewall 9200 can be extended upward and/or above its top edge 9220 using a removable, temporary, and/or biodegradable sidewall lining and/or extender 9999, thereby increasing the effective depth ED of tray 9100 to greater than its actual tray depth TD.

Figure 10:
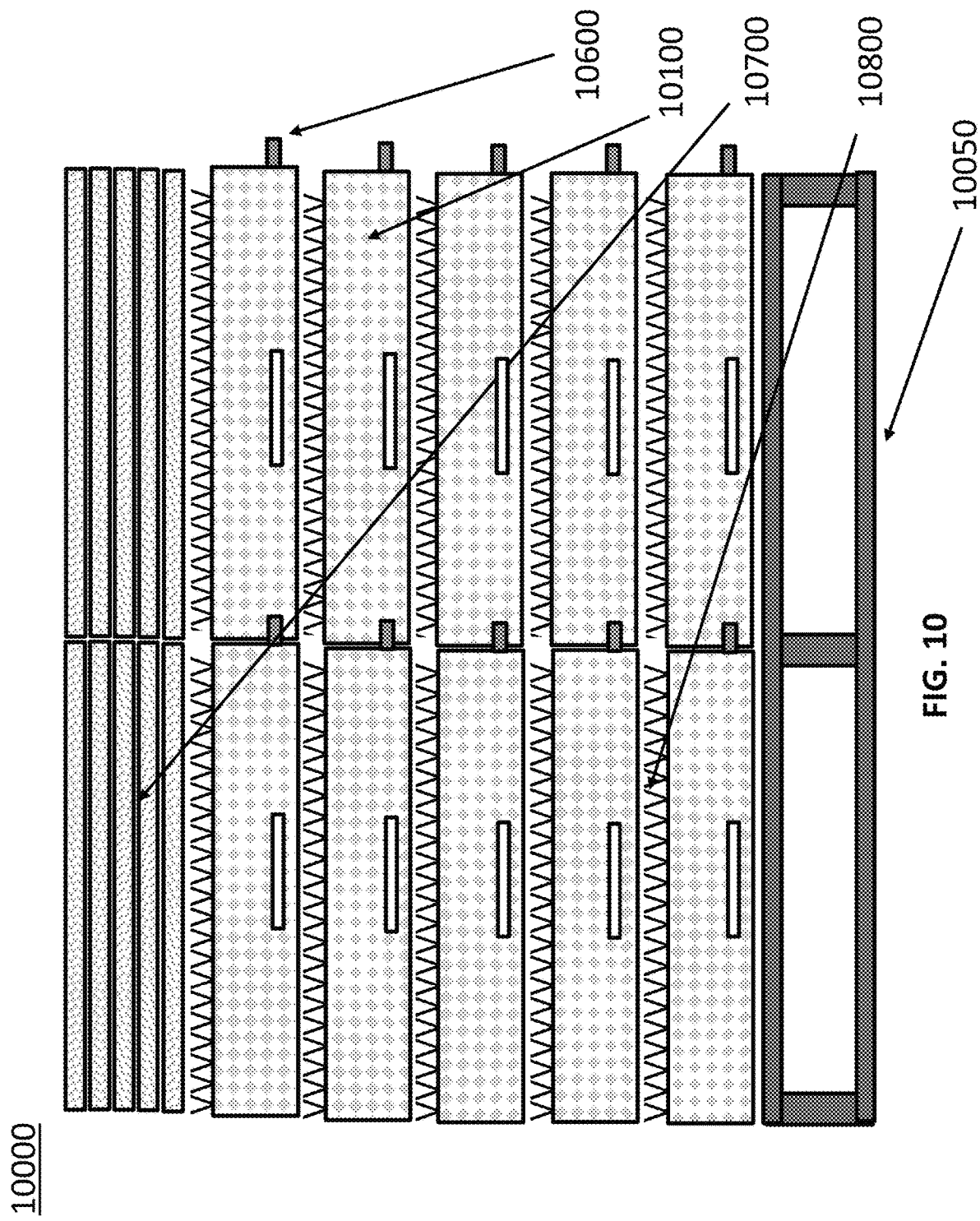
FIG. 10 is a side view of an exemplary embodiment of a water management system.

FIG. 10 is a side view of an exemplary embodiment of a water management system 10000, showing how numerous trays 10100 can be stacked on a pallet 10050 or in a shipping container. Note that drainage layers 10800 can separate trays 10100 and retention layers 10700 can be stacked above trays 10100. Note also that aligners 10600 can be pre-installed in and/or integrally molded into trays 10100 to facilitate quick installation of trays 10100 at their destination.

Thus, certain exemplary embodiments can provide a water management system comprising:
a plurality of trays that each define:
a bottom having a shape of a closed polygon; and
a plurality of sides connected to the bottom and oriented substantially perpendicularly to the bottom;
at least one retention layer configured to absorb at least a portion of water that falls upon the plurality of trays;
a drainage layer configured to allow the water to drain out of the at least one retention layer and to encourage airflow under the at least one retention layer;
a plurality of aligners, each aligner from the plurality of aligners configured to align a corresponding tray from the plurality of trays with another tray from the plurality of trays;
within each of the plurality of trays, a first plant growth media configured to grow a first plurality of plants within that tray; and/or
within each of the plurality of trays, a plurality of plants;
wherein:
the bottom defines a bottom interior-facing surface;
each side defines a side interior-facing surface,
at least one of the interior-facing surfaces defines a plurality of perforations that extend therethrough;
the perforations have a cross-sectional shape that is configured to allow roots to extend through the perforations and out of the tray;
each tray from the plurality of trays comprises a biodegradable bottom lining that substantially covers the interior-facing bottom surface.
each tray from the plurality of trays comprises a plurality of biodegradable side linings that each substantially covers its corresponding interior-facing side surface;
the plurality of trays are arranged in a contiguous horizontally-extending array;
each of the plurality of trays abuts at least one other of the plurality of trays;
each aligner from the plurality of aligners is configured to resist wind from uplifting a corresponding tray from the plurality of trays;
each aligner from the plurality of aligners is integral with a corresponding tray from the plurality of trays;
each aligner from the plurality of aligners protrudes from a corresponding tray from the plurality of trays and is configured to slide into an available female slot of a neighboring tray from the plurality of trays;
each of the plurality of trays is configured to prevent a first plant growth media from escaping that tray;
a first retention layer of the at least one retention layer is divided into a plurality of retention mats, each retention mat configured to fit substantially within or substantially under a corresponding tray;
the drainage layer is divided into a plurality of drainage mats, each drainage mat configured to fit substantially within or substantially under a corresponding tray;
the at least one retention layer is formed from mineral wool;
the at least one retention layer is configured as a second plant growth media;
for each of the plurality of trays, the one or more biodegradable side linings extend above the top of that tray;

for each of the plurality of trays, a plant growth media extends from within the tray to above the top of that tray; and/or for each of the plurality of trays, one or more sidewall extenders is attached thereto, each sidewall extender configured to increase the height of that tray.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level and/or place.
absorb—to take up or receive by chemical or molecular action.
abut—to be next to, lie adjacent, border upon, touch, and/or end at one end or side of.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
add—to combine, unite, and/or join so as to increase the number, quantity, size, or importance.
after—following in time and/or subsequent to.
airflow—a current of air.
align—to place objects such that at least some of their faces are in line with each other and/or so that their centerlines are on the same axis.
allow—to provide, let do, happen, and/or permit.
along—through, on, beside, over, in line with, and/or parallel to the length and/or direction of; and/or from one end to the other of.
and—in conjunction with.
and/or—either in conjunction with or in alternative to.
another—a different one.
any—one, some, every, and/or all without specification.
apparatus—an appliance or device for a particular purpose.
approximately—about and/or nearly the same as.
are—to exist.
around—about, surrounding, and/or on substantially all sides of; and/or approximately.
arrange—to dispose in a particular order.
array—a matrix and/or table.
as long as—if and/or since.
associate—to join, connect together, and/or relate.
at—in, on, and/or near.
at least—not less than, and possibly more than.
at least one—not less than one, and possibly more than one.
attached—connected, joined, and/or secured together.
available—obtainable, not busy, not otherwise committed, accessible, present, suitable, and/or ready for use and/or service.
axial—located on, around, or in the direction of an axis.
axis—a straight line about which a body and/or geometric object rotates and/or can be conceived to rotate and/or a center line to which parts of a structure and/or body can be referred.
between—in a separating interval and/or intermediate to.
biodegradable—capable of decaying through the action of living organisms, such as bacteria.
bottom—a lowest part of an object relative to a point of reference, the object in a predetermined orientation relative to the point of reference.
by—via and/or with the use and/or help of
can—is capable of, in at least some embodiments.
cause—to bring about, provoke, precipitate, produce, elicit, be the reason for, result in, and/or effect.
circle—a plane curve everywhere equidistant from a given fixed point, and/or the figure enclosed by such a curve.
circular—round, having the shape of a circle, and/or resembling a substantially round shape in which all points on a perimeter of the shape are substantially equidistant from a center of the shape.
circumference—a boundary line of a substantially circular figure, area, and/or object.
closed—enclosed and/or having boundaries.
complex—composite, intricate, involved, not simple, and/or a whole made up of interconnected or related parts.
composition of matter—a combination, reaction product, compound, mixture, formulation, material, and/or composite formed by a human and/or automation from two or more substances and/or elements.
comprising—including but not limited to.
configure—to design, arrange, set up, shape, and/or make suitable and/or fit for a specific purpose, function, use, and/or situation.
connect—to join, link, and/or fasten together.
connector—a device and/or system adapted to physically or logically join, link, couple, and/or fasten two or more entities.
containing—including but not limited to.
contiguous—neighboring and/or adjacent.
convert—to transform, adapt, and/or change.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
coupling—linking in some fashion.
cover—to overlay, place upon and/or over, and/or immerse.
create—to bring into being.
cross-section—a section formed by a plane cutting through an object at a right angle to an axis.
curved—to move in and/or take the shape of a curve.
define—to establish the meaning, relationship, outline, form, and/or structure of; and/or to precisely and/or distinctly describe and/or specify.
derive—to receive, obtain, and/or produce from a source and/or origin.
determine—to find out, obtain, calculate, decide, deduce, ascertain, and/or come to a decision, typically by investigation, reasoning, and/or calculation.

device—a machine, manufacture, and/or collection thereof.
dimension—an extension in a given direction and/or a measurement in length, width, or thickness.
divide—to separate, segregate, and/or split.
drain—to draw off (a liquid) by a gradual process, to cause liquid to go out from, to empty, to discharge, and/or to flow off and/or out of.
drainage—the action, process, and/or method of draining.
each—every one of a group considered individually.
effective—sufficient to bring about, provoke, elicit, and/or cause.
ellipse—A conic section whose plane is not parallel to the axis, base, or generatrix of the intersected cone and/or the locus of points for which the sum of the distances from each point to two fixed points is equal.
elliptical—of, relating to, or having the shape of an ellipse.
elongated—drawn out, made spatially longer, and/or having more length than width.
embodiment—an implementation, manifestation, and/or concrete representation.
encourage—to stimulate, spur, promote, boost, and/or advance.
escape—to get free, leak out of, seep out of, and/or to break loose from confinement and/or enclosure.
estimate—(n) a calculated value approximating an actual value; (v) to calculate and/or determine approximately and/or tentatively.
exemplary—serving as an example, instance, and/or illustration.
extend—to reach spatially outward, stretch, cover, and/or span.
extender—a device configured to extend, especially a dimension and/or in a predetermined direction.
facing—oriented toward and/or touching.
falls—impinges, hits, strikes, drops on, and/or is incident on.
female—a structure adapted to receive an corresponding extending structure.
first—an initial element in a set.
fit—adapted to be of the right size and/or shape for; adapted to conform to a shape of.
flow—(n) a stream and/or current; (v) to move and/or run smoothly with unbroken continuity, as in the manner characteristic of a fluid.
for—with a purpose of
formed—constructed.
from—used to indicate a source, origin, and/or location thereof.
further—in addition.
gap—a void, interruption of continuity, and/or a space between objects.
generate—to create, produce, give rise to, and/or bring into existence.
have—to possess as a characteristic, quality, or function.
having—including but not limited to.
height—a measurement of the extent of something along an, often substantially vertical, dimension.
horizontal—parallel to and/or in the plane of the horizon.
including—including but not limited to.
increase—to become greater or more in size, quantity, number, degree, value, intensity, and/or power, etc.
initialize—to prepare something for use and/or some future event.
install—to connect or set in position and prepare for use.
integral—monolithic and/or formed and/or united into another entity.
interior—being within; inside of anything; internal; inner; further toward a center, and/or a spatial location within a predetermined boundary.
into—to a condition, state, or form of
is—to exist in actuality.
layer—a single thickness of a material or materials in the form of a panel, web, course, lamina, coating, ply, strata, and/or sheet, and/or a plurality of any of these in side-by-side coplanar relation, and/or particulate material arranged in continuity to constitute a distinct stratum, the material(s) potentially covering a surface and/or forming an overlying part and/or segment.
length—a longest dimension of something and/or the measurement of the extent of something along its greatest dimension.
less than—having a measurably smaller magnitude and/or degree as compared to something else.
lining—a covering or coating for a surface.
longitudinal—of and/or relating to a length; placed and/or running lengthwise.
longitudinal axis—a straight line defined parallel to an object's length and passing through a centroid of the object.
manage—to exert control and/or influence over, direct, and/or control the use, affairs, and/or interests of
manage—to exert control or influence over, direct, and/or control the use, affairs, and/or interests of.
mat—a sheet, board, panel, and/or other similar substantially thin and planar body of material.
may—is allowed and/or permitted to, in at least some embodiments.
measured—determined, as a dimension, quantification, and/or capacity, etc. by observation.
media—a substance in which a specific organism lives and thrives.
method—one or more acts that are performed upon subject matter to be transformed to a different state or thing and/or are tied to a particular apparatus, said one or more acts not a fundamental principal and not preempting all uses of a fundamental principal.
mineral wool—An inorganic fibrous substance that is often produced by steam blasting and cooling molten glass and/or a similar substance and is used as an insulator, packing, and filter.
more—a quantifier meaning greater in size, amount, extent, and/or degree.
mutually—of or pertaining to each of two or more.
near—a distance of less than approximately [X].
neighboring—connected, adjacent, conterminous, and/or contiguous.
no—an absence of and/or lacking any.
obstacle—a barrier, impediment, obstruction, and/or something that stands in the way of or holds up.
obstruction—an obstacle, barrier, impediment, and/or something that stands in the way of or holds up.
offset—separated by more than an insubstantial distance.
one—being and/or amounting to a single unit, individual, and/or entire thing, item, and/or object.
operable—practicable and/or fit, ready, and/or configured to be put into its intended use and/or service.
opposing—opposite; against; being the other of two complementary or mutually exclusive things; placed or located opposite, in contrast, in counterbalance, and/or across from something else and/or from each other.

or—a conjunction used to indicate alternatives, typically appearing only before the last item in a group of alternative items.
orient—to position a first object relative to a second object.
orthogonal—perpendicular.
other—a different and/or distinct entity and/or not the same as already mentioned and/or implied.
out—in a direction away from the inside, center, and/or middle and/or beyond the boundaries of.
outside—beyond a range, boundary, and/or limit; and/or not within.
over—in and/or at a position above and/or higher than.
overhead—raised, suspended, elevated, overhanging, and/or located and/or originating from above.
pair—a quantity of two of something.
panel—a flat, usually rectangular piece, a sheet-like member, and/or any distinct section and/or component of something formed from a sheet o material.
parallel—of, relating to, and/or designating lines, curves, planes, and/or surfaces everywhere equidistant.
parallelogram—a quadrilateral whose opposite sides are parallel and equal in length, and including
partially—to a degree and/or extent, but not necessarily totally.
paver—a brick, tile, stone, block, or other substantially planar object configured for paving and/or forming a walkway.
pedestal—a support and/or foundation.
per—for each and/or by means of.
perforation—a hole made by or as if by boring, punching, and/or piercing through something.
perimeter—the outer limits or boundary of an area, shape, and/or object.
perpendicular—intersecting at or forming substantially right angles.
planar—shaped as a substantially flat two-dimensional surface.
plant—any organism of the kingdom Plantae, whether unharvested or harvested. Examples include crops, grains, tobacco, trees, nuts, flowers, vegetables, fruits, berries, and/or produce, etc.
plant growth—An irreversible increase in the size of the plant.
plurality—the state of being plural and/or more than one.
polygon—a closed plane figure made up of several line segments that are joined together.
portion—a part, component, section, percentage, ratio, and/or quantity that is less than a larger whole.
pre-—a prefix that precedes an activity that has occurred beforehand and/or in advance.
predetermine—to determine, decide, and/or establish in advance.
prevent—to hinder, avert, and/or keep from occurring.
prior—before and/or preceding in time or order.
probability—a quantitative representation of a likelihood of an occurrence.
product—something produced by human and/or mechanical effort.
project—to calculate, estimate, or predict.
protrude—to bulge, jut, project, and/or extend out and/or into space and/or beyond a predetermined threshold and/or surface.
provide—to furnish, supply, give, and/or make available.
quadrilateral—a four-sided polygon.
quarter—one of four equal or nearly equal parts of an object, quantity, amount, etc.
raised—elevated and/or being positioned above a given level.
range—a measure of an extent of a set of values and/or an amount and/or extent of variation.
ratio—a relationship between two quantities expressed as a quotient of one divided by the other.
receive—to gather, take, acquire, obtain, accept, get, and/or have bestowed upon.
recommend—to suggest, praise, commend, and/or endorse.
rectangle—a parallelogram with four right angles.
reduce—to make and/or become lesser and/or smaller.
region—an area and/or zone.
remove—to eliminate, remove, and/or delete, and/or to move from a place or position occupied.
repeat—to do again and/or perform again.
repeatedly—again and again; repetitively.
request—to express a desire for and/or ask for.
resemble—to visually exhibit similarity and/or likeness to.
resist—to avoid, act, and/or remain firm against and/or in opposition to the actions, effects, and/or force of
respective—pertaining individually to each of a number of things.
result—(n.) an outcome and/or consequence of a particular action, operation, and/or course; (v.) to cause an outcome and/or consequence of a particular action, operation, and/or course.
retain—to contain, keep, and/or hold in place and/or position.
retention—the act of retaining and/or the condition of being retained.
retentive—having the quality, power, and/or capacity to substantially retain.
root—the usually underground portion of a plant that lacks buds, leaves, or nodes and/or serves as support, draws minerals and water from the surrounding soil, and/or sometimes stores food.
said—when used in a system or device claim, an article indicating a subsequent claim term that has been previously introduced.
second—an entity immediately following a first entity in an ordering, series, and/or set.
select—to make a choice or selection from alternatives.
set—a related plurality.
shape—a characteristic surface, outline, and/or contour of an entity.
side—a surface bounding an object.
slide—to, in a smooth and/or continuous motion, move one object relative to another.
slot—a narrow opening and/or aperture; and/or an opening having a longer length than a width of the opening.
species—a class of individuals and/or objects grouped by virtue of their common attributes and assigned a common name; a division subordinate to a genus.
square—a plane rectangle with four sides of equal length and four right angles.
store—to place, hold, and/or retain data, typically in a memory.
substantially—to a great extent and/or degree.
substantially adjacent—close to, lying near, next to, close, contiguous, adjoining, neighboring, abutting, with little or no space between, and/or within a horizontal distance of less than one inch away. For example, an object is substantially adjacent to another object when separated by, in inches: 1, 0.89, 0.75, 0.5, 0.25, 0.1, 0.01, 0.001, 0.0001, 0, and/or any value or sub-range therebetween.
subtract—to deduct, remove, and/or take away from the whole.
support—to bear the weight of, especially from below.
surface—the face and/or outer boundary of an object and/or a material layer constituting and/or resembling such a boundary.
system—a collection of mechanisms, devices, machines, articles of manufacture, processes, data, and/or instructions, the collection designed to perform one or more specific functions.
that—used as the subject or object of a relative clause.
therethrough—in one end and out another end of an object.
thereto—to that.
thickness—the measure of the smallest dimension of a solid figure.
three—a cardinal number equal to one plus one plus one.
through—across, among, between, and/or in one side and out the opposite and/or another side of
to—a preposition adapted for use for expressing purpose.
top—an uppermost point and/or above relative to a pre-determined orientation of an object.
transform—to change in measurable: form, appearance, nature, and/or character.
tray—a substantially shallow flat receptacle with a raised edge and/or rim, used for carrying, holding, constraining, and/or displaying articles.
treatment—an act, manner, or method of handling and/or dealing with someone and/or something.
two—a cardinal number equal to one plus one.
under—beneath, below, and/or in a lower position and/or place than.
uplifting—lifting upwards.
upon—immediately or very soon after; and/or on the occasion of.
use—to put into service.
usual place.
vertical—substantially perpendicular to horizontal.
via—by way of and/or utilizing.
view—to look at, examine, and/or inspect.
wall—a layer of material that at least partially encloses space.
water—a transparent, odorless, tasteless liquid containing approximately 11 percent hydrogen and approximately 89 percent oxygen, by weight, characterized by the chemical formula $H_2O$, and, at standard pressure (approximately 14.7 psia), freezing at approximately 32° F. or OC and boiling at approximately 212° F. or 100 C, but which can contain impurities.
weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.
when—at a time and/or during the time at which.
wherein—in regard to which; and; and/or in addition to.
which—a pronoun adapted to be used in clauses to represent a specified antecedent.
width—the extent of something from side to side and/or orthogonal to length and thickness.
wind—moving air.
with—accompanied by.
with regard to—about, regarding, relative to, and/or in relation to.
with respect to—about, regarding, relative to, and/or in relation to.
within—inside the limits of.
zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like can, but do not necessarily, refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;
no described characteristic, function, activity, substance, or structural element is "essential"; and
within, among, and between any described embodiments:
any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically; and any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A water management system comprising:
   a plurality of trays that each define:
   a bottom having a shape of a closed polygon; and a plurality of sides connected to the bottom and oriented substantially perpendicularly to the bottom;
   wherein: the bottom defines a bottom interior-facing surface;
   each side defines a side interior-facing surface,
   at least one of the interior-facing surfaces defines a plurality of perforations that extend therethrough; and
   the perforations have a cross-sectional shape that is configured to allow roots to extend through the perforations and out of the tray;
   at least one retention layer configured to absorb at least a substantial portion of water that falls upon the plurality of trays;
   a drainage layer configured to allow the water to drain out of the at least one retention layer; and
   a plurality of aligners, each aligner from the plurality of aligners configured to align a corresponding tray from the plurality of trays with another tray from the plurality of trays,
   wherein the retention layer is configured between the drainage layer and tray.

2. The system of claim 1, further comprising:
   within each of the plurality of trays, a first plant growth media configured to grow a first plurality of plants within that tray.

3. The system of claim 1, further comprising:
   within each of the plurality of trays, a plurality of plants.

4. The system of claim 1, wherein:
   each tray from the plurality of trays comprises a biodegradable bottom lining that substantially covers the interior-facing bottom surface.

5. The system of claim 1, wherein: each tray from the plurality of trays comprises a plurality of biodegradable side linings that each substantially covers its corresponding interior-facing side surface.

6. The system of claim 1, wherein:
   the plurality of trays are arranged in a contiguous horizontally-extending array.

7. The system of claim 1, wherein:
   each of the plurality of trays abuts at least one other of the plurality of trays.

8. The system of claim 1, wherein:
   each aligner from the plurality of aligners is configured to resist wind from uplifting a corresponding tray from the plurality of trays.

9. The system of claim 1, wherein:
each aligner from the plurality of aligners is integral with a corresponding tray from the plurality of trays.

10. The system of claim 1, wherein:
each aligner from the plurality of aligners protrudes from a corresponding tray from the plurality of trays and is configured to slide into an available female slot of a neighboring tray from the plurality of trays.

11. The system of claim 1, wherein:
each of the plurality of trays is configured to prevent a first plant growth media from escaping that tray.

12. The system of claim 1, wherein:
a first retention layer of the at least one retention layer is divided into a plurality of retention mats, each retention mat configured to fit substantially within or substantially under a corresponding tray.

13. The system of claim 1, wherein:
the drainage layer is divided into a plurality of drainage mats, each drainage mat configured to fit substantially within or substantially under a corresponding tray.

14. The system of claim 1, wherein:
the at least one retention layer is formed from mineral wool.

15. The system of claim 1, wherein:
the at least one retention layer is configured as a plant growth media.

16. The system of claim 1, wherein:
for each of the plurality of trays, one or more biodegradable side linings extend above the top of that tray.

17. The system of claim 1, wherein:
for each of the plurality of trays, a plant growth media extends from within the tray to above the top of that tray.

18. The system of claim 1, wherein:
for each of the plurality of trays, one or more sidewall extenders is attached thereto, each sidewall extender configured to increase the height of that tray.

19. The system of claim 1, wherein:
said retention layer is die-cut in the shape that allows seams between panels to be off-set from the seams between pavers.

20. The system of claim 1, wherein:
said retention layer comprises a sponge-like and/or water absorbing material that uses absorption to retain water.

* * * * *